United States Patent [19]

Duffey

[11] 4,117,957

[45] Oct. 3, 1978

[54] ATOMIZER VALVE ASSEMBLY

[76] Inventor: George Duffey, 720 Nolan, Glendale Heights, Ill. 60137

[21] Appl. No.: 786,418

[22] Filed: Apr. 11, 1977

[51] Int. Cl.² .......... G01F 11/38

[52] U.S. Cl. .......... 222/321

[58] Field of Search .......... 222/321, 341, 385, 387; 239/321, 322, 331, 333

[56] References Cited

U.S. PATENT DOCUMENTS

| | | | |
|---|---|---|---|
| 3,159,316 | 12/1964 | O'Donnell et al. | 222/321 |
| 3,627,206 | 12/1971 | Boris | 239/321 |
| 3,746,260 | 7/1973 | Boris | 239/321 |
| 3,774,849 | 11/1973 | Boris | 222/385 X |
| 3,923,250 | 12/1975 | Boris | 239/321 |

*Primary Examiner*—Evon C. Blunk
*Assistant Examiner*—Andres Kashnikow
*Attorney, Agent, or Firm*—Thomas R. Vigil

[57] ABSTRACT

The atomizer valve assembly is constructed and arranged so that upon depressing an actuator thereof, a metered amount of liquid is first placed under pressure followed by the opening of a valve to dispense pressurized liquid from a nozzle in the actuator in a fine spray or puff of liquid. The assembly includes a cylinder with a plunger therein having a lower skirt portion engaging the interior of the cylinder. The plunger is received within a piston having a similar shape as the plunger. A dispensing spring is situated between the skirt portions of the plunger and the piston. A needle valve member having a stem portion and a disc-shaped bottom portion is positioned beneath the plunger with the stem portion extending into the plunger. At least one valve is formed between the needle valve member and the plunger and a metering chamber with a spring therein is defined between the disc-shaped bottom portion and the bottom of the cylinder. Depression of the actuator places the liquid in the metering chamber under pressure, followed by relative movement between the needle valve member and the plunger so as to open up the valve(s) between the needle valve member and the plunger thereby to allow the pressurized liquid in the metering chamber to flow out of the nozzle in the actuator in a fine spray or puff of liquid.

18 Claims, 7 Drawing Figures

ATOMIZER VALVE ASSEMBLY

BACKGROUND OF THE INVENTION

1. Field of the Invention

The present invention relates to fluid-spraying devices, and more particularly, to a fluid-spraying device which includes a supply holder for the material to be sprayed and a follower in a holder with a floating or biased piston.

2. Description of the Prior Art

Heretofore, various atomizer valve assemblies have been proposed and examples of such valve assemblies can be found in the following United States patents:

| U.S. Pat. No. | Patentee |
|---|---|
| 3,159,316 | O'Donnell et al. |
| 4,223,292 | Feeney et al. |
| 3,228,570 | Steiman |
| 3,399,836 | Pechstein |
| 3,627,206 | Boris |
| 3,746,260 | Boris |
| 3,797,748 | Nozawa et al. |
| 3,799,448 | Nozawa et al. |
| 3,923,250 | Boris |

Many of the previously proposed atomizer valve assemblies provided for actuation of an actuator having a nozzle therein, such actuation causing the compression of a metered amount of liquid which is to be atomized as it is dispensed, followed by the opening of a valve within the assembly to permit the now pressurized metered amount of liquid to escape through the nozzle in an atomized spray. Examples of where this is accomplished in one stroke during the depression of an actuator on top of the assembly are disclosed in U.S. Pat. Nos. 3,746,260 and 3,923,250, referred to above. In these patents, a metered amount of liquid is first compressed when the actuator is depressed. The pressure of the metered amount of liquid is communicated to a chamber where a piston connected to a needle valve is spring biased to a needle valve closed position. As the pressure of the liquid in this chamber increases, the piston is moved against the spring, thereby to open the needle valve, allowing the pressurized liquid in the metering chamber to flow around the needle and out the needle valve through the nozzle in the actuator.

The atomizer valve assembly of the present invention provides a different configuration, arrangement and assembly of parts for achieving first a compression of a metered amount of liquid, followed by the opening of a needle valve to dispense the pressurized liquid through a nozzle in an actuator. Also, it is believed that the atomizer valve assembly of the present invention provides advantages over the previously proposed atomizer valve assemblies, e.g., the advantages being simpler in construction and operation and being less expensive. Also, the specific construction, arrangement and operation of the parts of the present atomizer valve assembly have been found to provide a desired fine spray or puff of liquid without liquid drops dripping from the nozzle after spraying is completed.

SUMMARY OF THE INVENTION

According to the invention, there is provided an atomizer valve assembly comprising a cylinder, one-way valve means at the lower end of said cylinder, a piston having a lower skirt portion engaging the interior sidewall of said cylinder and an upper tubular portion which extends through an opening at the top of said cylinder and which has a passageway through the top thereof, an actuator mounted to said top of said piston and having a nozzle in a wall thereof and a passageway therein between said nozzle and said top of said piston, a plunger having a lower skirt portion engaging said interior sidewall of said cylinder beneath said skirt portion of said piston and an upper tubular portion which has a passageway through the top thereof and which is received within the interior of said piston tubular portion, a dispensing spring situated between said skirt portions, a valve member situated beneath said plunger and having a wide bottom portion, the area between said bottom portion and said lower end of said cylinder defining a metering chamber, a metering spring situated in said metering chamber between said lower end of said cylinder and said bottom portion of said valve member, and valve means between said valve member and said plunger for blocking flow of liquid from said metering chamber through said plunger tubular portion and said passageway at the upper end of said plunger tubular portion to said nozzle.

DESCRIPTION OF THE PREFERRED EMBODIMENT

Figure 1:
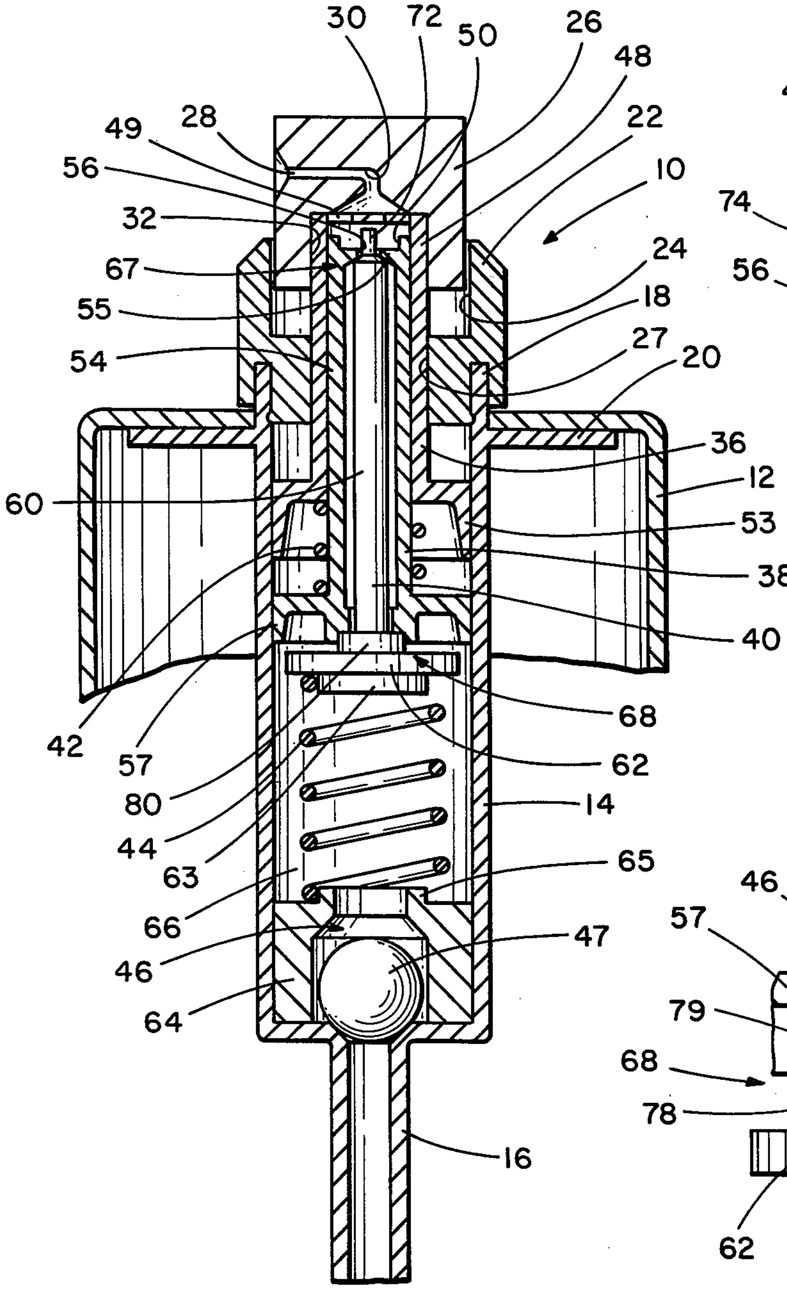
FIG. 1 is a longitudinal, part-sectional view of the atomizer valve assembly of the present invention in an at rest or neutral position.

Referring now to the drawings in greater detail, there is illustrated in FIG. 1 a longitudinal sectional view of the atomizer valve assembly of the present invention which is generally identified therein by the reference numeral 10. The atomizer valve assembly 10 includes a container capping member 12, part of which is broken away, and which could be snapped on, cemented to or threadingly received on the top of a container (not shown).

A cylinder 14 which has a dip tube 16 extending from the lower end thereof and which is open at the upper end 18 thereof extends through and is secured to the capping member 12. For this purpose, the cylinder 14 has a circular flange 20 extending radially outwardly therefrom at a location slightly below the open upper end 18 and which flange 20 is secured within and to the member 12 as shown.

The upper end 18 of the cylinder 14 is closed by a cap member 22 which has a cavity 24 therein within which is received an actuator 26. The cap 22 has a through bore 27 which communicates the interior of the cylinder 14 with the cavity 24. The actuator 26 has an outlet orifice or nozzle 28 and an interior passageway 30 which communicates between the nozzle 28 and a cavity 32 opening onto the bottom of the actuator 26.

Within the cylinder 14 is situated a piston 36, a plunger 38, a needle valve member 40, an upper or dispensing spring 42, a lower or metering spring 44 and a one-way ball valve assembly 46 including a ball 47.

Figure 6:
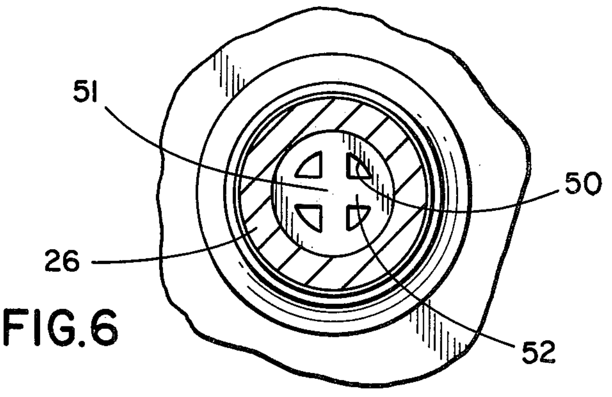
FIG. 6 is a fragmentary top view of the piston of the atomizer valve assembly shown in FIG. 4 taken along line 6—6 of FIG. 4.

The piston 36 has an upper tubular portion 48 which is closed at a top 49 thereof except for four ports or passageways 50 therein. As best shown in FIG. 6, the top 49 has a central solid portion 51 with spoke like members 52 extending therefrom and defining the ports 50 therebetween. Integral with and extending from the tubular portion 48 is a skirt portion 53 which engages the interior sidewall of the cylinder 14.

The plunger 38 also has an upper tubular portion which is identified by reference numeral 54 and which is received within the hollow tubular portion 48 of the piston 36. A top 55 of the hollow tubular portion 54 has a passageway 56 therein which communicates the interior of the plunger tubular portion 54 with the upper interior area within the piston tubular portion 48. Integral with the plunger tubular portion 54 is a skirt portion 57 which engages the interior sidewall of the cylinder 14.

As shown, the dispensing spring 42 is situated between the underside of the skirt portion 53 of the piston 36 and the upper surface of the skirt portion 57 of plunger 38.

The needle valve member 40 includes a stem portion 60 which extends upwardly into the plunger tubular portion 54 and wide bottom portion 62 which is integral with the bottom of the stem portion 60 and which is generally disc-shaped. As shown, the metering spring 44 is disposed between the disc shaped bottom portion 62 and the one-way valve assembly 46 and biases the needle valve member 40 upwardly, i.e., it biases the stem portion 60 into the interior of the plunger tubular portion 54. To facilitate proper locating of the spring 44, the bottom portion 62 has a locating hub 63 on the under surface thereof which receives, locates and centers one end of the spring 44. Likewise the one-way valve assembly 46 includes a block member 64 having a locating hub 65 which receives, locates and centers the other end of the spring 44. The volume beneath the valve member 40 and between the bottom 62 thereof and the lower end of the cylinder 14 defines a metering chamber 66.

In the illustrated embodiment, the atomizer valve assembly has two valves therein, namely, an upper valve 67 and a lower valve 68. For the sake of clarity and so as not to obscure the details of the valves 67 and 68 in FIGS. 1, 4 & 5 with lead lines, many of the reference numerals identifying such details are omitted from FIGS. 1, 4 & 5. However, such details are shown and identified in FIG. 2 or 3 and the valves 67 and 68 will now be described with reference to FIG. 2 or 3.

Figure 2:
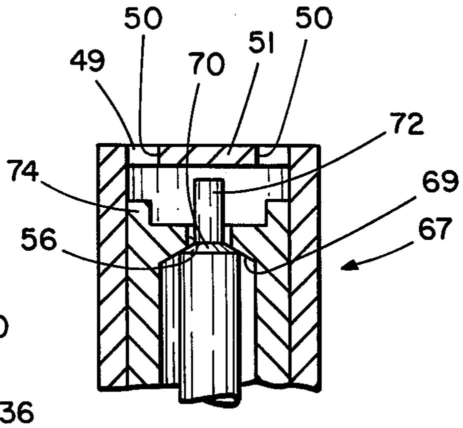
FIG. 2 is an enlarged sectional view of the upper valve of the atomizer valve assembly shown in FIG. 1 in a valve closed position.

As shown in FIG. 2, valve 67 is formed between a frusto-conical valve seat 69 beneath the top 55 of the plunger tubular portion 54 adjacent the central passageway 56 therein and a frusto-conical valve seat 70 at and on the upper end of the valve stem portion 60.

Figure 5:
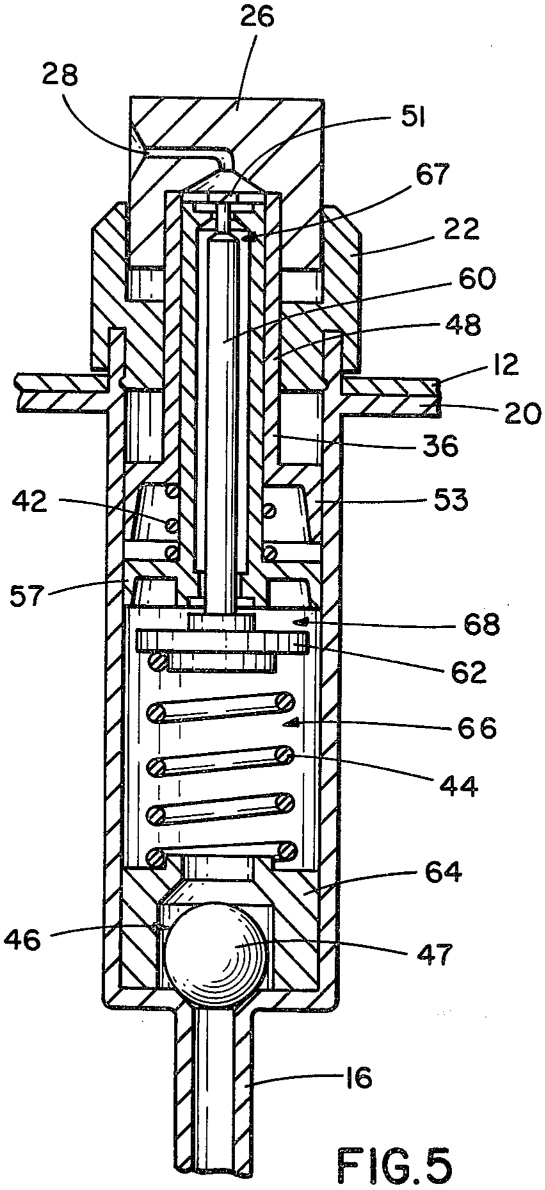
FIG. 5 is a longitudinal, sectional view of a portion of the atomizer valve assembly similar to the view shown in FIG. 4, after the actuator has been depressed further to open the upper and lower valves.

In the illustrated embodiment, a boss 72 extends from the upper end of the stem portion 60 through the passageway 56 in position to be engaged by the undersurface of the top 49 of the piston 36. As best shown in FIG. 2, the top 55 of the plunger 38 has an annular shoulder 74 which has a width less than the inward radial extent of the ports 50 to ensure a passageway between the top of the plunger tubular portion 54 and the ports or passageways 50 in the top 49 of the piston tubular portion 48 when the plunger 38 is in its upper most position within the piston 36 as the actuator 26 is depressed as shown in FIG. 5. Also the length of the boss 72 is less than the distance from the valve seat 68 to the top surface of annular shoulder 74 so that when the piston 36 is depressed and the underside of the top 49 thereof engages the boss 72 it will urge the stem portion 60 downwardly to unseat the valve seats 69 and 70 thereby opening the upper valve 67.

Figure 3:
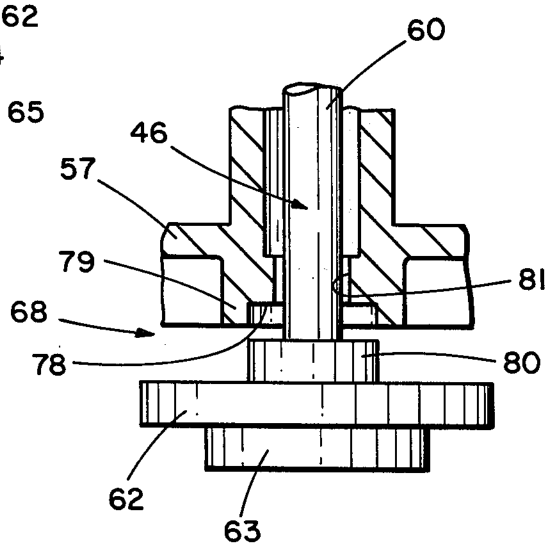
FIG. 3 is an enlarged sectional view of the lower valve of the atomizer valve assembly shown in FIG. 1 in a valve open position.

Referring now to FIG. 3, there is illustrated therein the lower valve 68 which is formed between a first valve surface defined within an annular cavity 78 formed in a hub 79 on the underside of the plunger skirt portion 57 and a second valve surface defined by the exterior surface of an annular shoulder 80 on the upper surface of the bottom portion 62 at the base of the stem portion 60. If desired, the corner of the cavity 78 and the corner of the shoulder 80 can have a frusto-conical bevel to facilitate entry of the shoulder 80 into the cavity 78. As shown, the hub 79 has a passageway 81 therethrough which communicates the cavity 78 with the interior of the plunger tubular portion 54.

Figure 4:
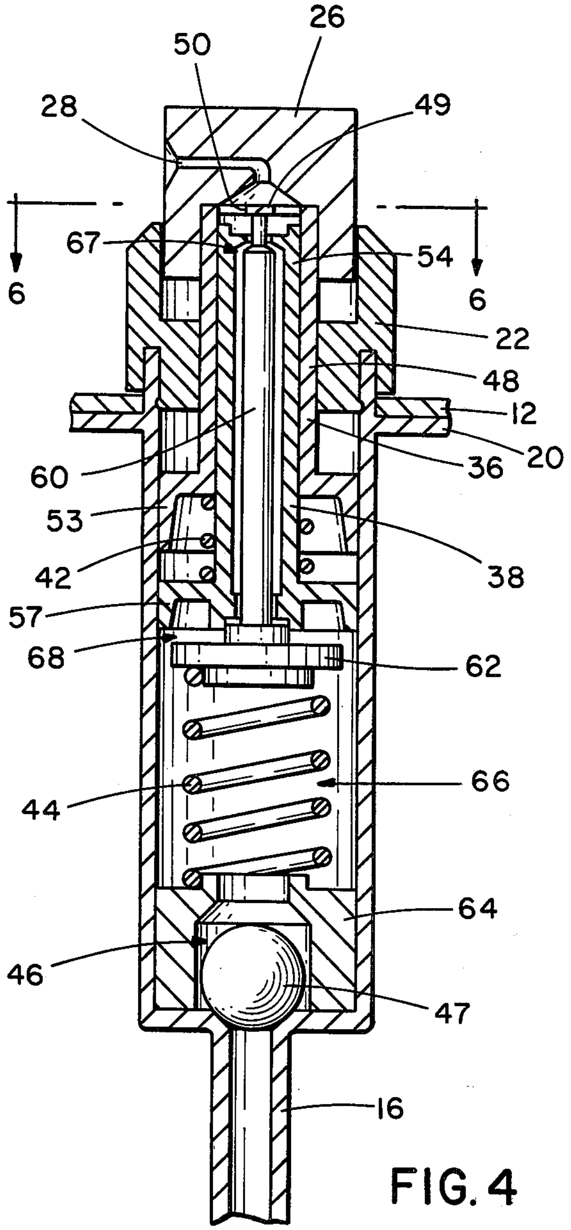
FIG. 4 is a longitudinal, sectional view similar to FIG. 1 and showing the atomizer valve assembly after the actuator thereof has been partially depressed to open the upper valve.

In FIG. 1 the components of the atomizer valve assembly 10 are shown in an at rest position thereof where both the upper valve 67 and the lower valve 68 are closed. Upon actuation, i.e., depression, of the actuator 26 the piston top 49 engages and moves the boss 72 relative to the plunger 38 so as to open the upper valve 67 to communicate the interior of the piston 36 with the interior of the plunger 38 as best shown in FIG. 4. However, the annular shoulder 80 is only moved part way out of the cavity 78 such that the lower valve 68 remains closed. Meanwhile, at the same time, the bottom portion 62 of the valve member 40 depresses the metering spring 44 allowing the piston 36 to act against the dispensing spring 42 to urge the plunger 38 downwardly thereby to place the liquid in the metering chamber 66 under pressure. As the liquid in the metering chamber 66 is pressurized further, the force of this pressure acts on the dispensing spring 42 and compresses the same causing relative movement between the plunger 38 and the needle valve member 40 to ensure opening of the upper valve 67 eventually resulting in the unseating of the first valve surface in cavity 78 from the second valve surface on the shoulder 80 thereby opening the lower valve 68. This action is best illustrated in FIG. 5. In other words, as the actuator 26 is depressed more pressure is placed on the liquid in the metering chamber 66 which pressure urges the plunger 38 upwardly until the lower valve is opened upon the separation of the first and second valve surface as shown in FIG. 5. At this point the liquid under pressure within the metering chamber 66 can flow through lower valve 68, passageway 81, between the stem portion 60 and the hollow interior of the plunger tubular portion 54 past and through upper valve 67 through passageway 56 and openings 50, and from there through passageway 30 and out of nozzle 28. As a result of the delayed valve opening action and the building up of pressure on the liquid in metering chamber 66, the liquid flow out of the nozzle 28 in a fine spray or puff. In other words, there is a fine spray discharge or puff effect so that a desired fine atomization or misting of the liquid being sprayed from the atomizer valve assembly 10 is obtained. Note that this fine spray is continued as the actuator 26 is pressed further downwardly from the position thereof shown in FIG. 5 until it engages the bottom of the cavity 24 in the cap member 22.

Of course, once the downward movement of the actuator 26 is stopped the pressure on the liquid in metering chamber 66 diminishes quickly allowing the dispensing spring 42 to urge the plunger 38 downwardly to close the lower valve 68 thereby stopping the spray often without droplets dripping from the nozzle 28 and at the same time closing the metering chamber 66 with a smaller volume therein. Then, when the actuator is released and the needle valve member 40, the plunger 38 and the piston 36 move upwardly under the force of metering spring 44, the one-way valve assembly 46 is opened to refill the metering chamber 66 with liquid and ready same for subsequent operation of the atomizer valve assembly 10.

Experience with working models of the atomizer valve assembly 10 have shown that that valve assembly 10 works very well and provides a very fine mist with a puff effect and without the dripping of liquid from the nozzle 28 after the puff of liquid is discharged from the nozzle 28.

From the foregoing description it will be apparent that obvious modifications and alternations can be made to the atomizer valve assembly 10 of the present invention without departing from the teachings of the invention. For example, the upper valve 67 could be omitted and an atomizer valve assembly is provided which will work, although not as good as the preferred embodiment of the atomizer valve assembly 10 described above.

Figure 7:
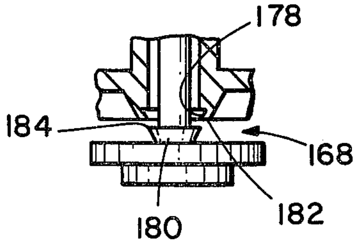
FIG. 7 is a fragmentary sectional view of a modified lower valve of the atomizer valve assembly shown in FIG. 1 in a valve-open position

Also, the lower valve 68 can be modified to provide a snap fit. In this regard and as shown in FIG. 7 a modified lower valve, identified by reference numeral 168, can have a frusto-conically shaped cavity or socket 178 and a mating frusto-conically shaped shoulder 180. The taper or slope of the cone may be slight and is exaggerated in FIG. 7. In this modification, the slope or taper extends downwardly and inwardly from the bottom of the cavity 178 to an outer (bottom) lip 182 which defines an opening having a diameter less than the diameter of a circular edge 184 of the shoulder 180 which tapers outwardly and upwardly from the disc-shaped bottom portion 62 (which is unchanged) to the edge 184. The edge 184 has a diameter essentially the same as the diameter of the bottom of the cavity 178. The lip 182 is, of course, made of a flexible plastic to permit flexing thereof upon relative movement between the valve member 40 (which is otherwise unchanged) and the plunger 38 (which is otherwise unchanged) when the shoulder 180 is snap-fitted in or out of the cavity 178. Also, the stem portion 60 (which is unchanged) ensures snap-fitting engagement by maintaining alignment between the cavity 178 and the shoulder 180.

In this modification, both the upper and lower valves 67 and 168 are held in the closed position thereof by the snap-fit resistance to movement established between the cavity 178 and shoulder 180 as pressure is applied to the actuator 26. When this resistance is overcome, the valve member 40 will snap out of the cavity 178, thereby to obtain the desired puff or fine spray effect.

Further from the foregoing description it will be apparent that the atomizer valve assembly 10 of the present invention has a number of advantages some of which have been described above and others of which are inherent in the invention. Accordingly, the scope of the invention is only to be limited as necessitated by the accompanying claims.

I claim:

1. An atomizer valve assembly comprising a cylinder, one-way valve means at the lower end of said cylinder, a piston having a lower skirt portion engaging the interior sidewall of said cylinder and an upper tubular portion which extends through an opening at the top of said cylinder and which has a passageway through the top thereof, an actuator mounted to said top of said piston and having a nozzle in a wall thereof and a passageway therein between said nozzle and said top of said piston, a plunger having a lower skirt portion engaging said interior sidewall of said cylinder beneath said skirt portion of said piston and an upper tubular portion which has a passageway through the top thereof and which is received within the interior of said piston tubular portion, a dispensing spring situated between said skirt portions, a valve member situated beneath said plunger and having a wide bottom portion, the area between said bottom portion and said lower end of said cylinder defining a metering chamber, a metering spring situated in said metering chamber between said lower end of said cylinder and said bottom portion of said valve member, and valve means between said valve member and said plunger for blocking flow of liquid from said metering chamber through said plunger tubular portion and said passageway at the upper end of said plunger tubular portion to said nozzle.

2. The atomizer valve assembly according to claim 1 wherein said valve member comprises a needle valve member having a stem portion extending upwardly from said bottom portion into said plunger.

3. The atomizer valve assembly according to claim 2 wherein said valve means includes an upper valve comprising a valve seat on the upper end of said stem portion and a mating valve seat formed on the underside of said top of said plunger tubular portion.

4. The atomizer valve assembly according to claim 3 including a boss at the upper end of said stem portion, said boss extending through said passageway in said top of said plunger in position to be engaged by the underside of said top of said piston which is capable of urging said valve member downwardly to open said upper valve.

5. The atomizer valve assembly according to claim 2 wherein said valve means includes a lower valve comprising a valve surface situated on and at the junction between said stem portion and said bottom portion of said valve member and a mating valve surface on the underside of said plunger.

6. The atomizer valve assembly according to claim 5 wherein said plunger and said needle valve member are moved downwardly at least in part, by the force acting through the dispensing spring from said piston skirt portion to said plunger skirt portion as the actuator is pushed downwardly, and said lower valve is opened when the pressure of the metered amount of liquid in said metering chamber, which liquid is also being placed under pressure by downward movement of said actuator, exceeds the pressure on said dispensing spring, causing relative movement between said plunger and said valve member.

7. The atomizer valve assembly according to claim 5 wherein said stem portion has a boss at the upper end thereof which extends through said passageway through said top of said plunger, said boss being engaged by the underside of said top of said piston when said actuator is pushed downwardly against said piston, the engagement of said boss by said piston urging said valve surface on said valve member away from said valve surface or said plunger, while at the same time, the pressure of the liquid being placed under pressure in said metering chamber urges said plunger upwardly away from said valve surface on said valve member, thereby to open said lower valve of said valve means.

8. The atomizer valve assembly according to claim 7 wherein said valve means includes an upper valve comprising a valve seat on the upper end of said valve stem adjacent said boss and a mating valve seat on the underside of said top of said plunger tubular portion said plunger and said valve member being dimensioned, arranged and constructed so that upon depression of said actuator, the liquid in said metering chamber is placed under pressure, while at the same time, said upper valve is opened, and so that further depression of said actuator will place more pressure on the liquid in said metering chamber resulting in relative movement between said plunger and said valve member as said dispensing spring is compressed to open said lower valve.

9. The atomizer valve assembly according to claim 3 wherein said valve seats are frusto-conical.

10. The atomizer valve assembly according to claim 4 wherein the length of said boss is greater than the distance between said plunger valve seat and said top of said plunger so that, as said piston is depressed, the underside of said top of said piston will engage said boss to move said stem portion and unseat said valve seats to open said upper valve.

11. The atomizer valve assembly according to claim 4 wherein said boss has a smaller cross section than the cross section of said passageway through said top of said plunger in which said boss is received.

12. The atomizer valve assembly according to claim 1 wherein said top of said piston has a central solid portion connected to said cylinder sidewall by a plurality of spoke like portions defining therebetween a plurality of passageways.

13. The atomizer valve assembly according to claim 12 wherein said top of said plunger has an annular shoulder having a width less than the inwardly radial extent of said plurality of passageways whereby a passage means for facilitating flow of liquid from said plunger through said piston is provided between said plunger and said piston when said top of said piston is pressed against top of said plunger.

14. The atomizer valve assembly according to claim 1 wherein said cylinder has an open top and said assembly further includes a cap member received on said open top and having a cavity in the top thereof and an opening therethrough communicating said cavity with the interior of said cylinder, said upper end of said piston being received through said opening and said actuator being received in said cavity and on said upper end of said piston.

15. The atomizer valve assembly according to claim 5 wherein said valve surface on said plunger is defined by a cylindrical cavity in the underside of said skirt portion of said plunger there being a passageway between said cylindrical cavity and the hollow interior of said plunger into which said stem portion extends and said valve surface on said valve member is defined by an annular shoulder on the top of said bottom portion around the base of said stem portion, said shoulder being sized to fit in said cavity in a sealing relationship therewith.

16. The atomizer valve assembly according to claim 15 wherein the edge of said cavity and the edge of said shoulder have a frusto-conical bevel to facilitate mating engagement with each other.

17. The atomizer valve assembly according to claim 5 wherein said bottom portion of said valve member is generally disc-shaped and has a locating hub on the underside thereof and said lower end of said cylinder has a similarly formed locating hub therein and said metering spring is received on and between said locating hubs.

18. The atomizer valve assembly according to claim 15 wherein said cavity and said shoulder have mating frusto-conical shapes with said cavity having a sidewall which tapers downwardly and inwardly from the bottom thereof to a lip defining an opening of said cavity having a diameter less than the diameter of said bottom of said cavity and said shoulder having a sidewall which tapers upwardly and outwardly from said disc-shaped bottom portion to an outer edge of said shoulder which outer edge has a diameter substantially the same as the diameter of said cavity bottom.

* * * * *